United States Patent [19]

Taniguchi et al.

[11] Patent Number: 5,541,752
[45] Date of Patent: Jul. 30, 1996

[54] LIQUID CRYSTAL APPARATUS

[75] Inventors: Osamu Taniguchi, Chigasaki; Yoshio Hotta, Atsugi; Shinjiro Okada, Isehara; Hironobu Mizuno, Hiratsuka; Yutaka Inaba, Kawaguchi; Yukio Hanyu, Atsugi; Tadashi Mihara, Isehara; Yasuto Kodera, Fujisawa; Katsutoshi Nakamura, Atsugi, all of Japan

[73] Assignee: Canon Kabushiki Kaisha, Tokyo, Japan

[21] Appl. No.: 284,051

[22] Filed: Aug. 1, 1994

Related U.S. Application Data

[63] Continuation of Ser. No. 868,327, Apr. 14, 1992, abandoned.

[30] Foreign Application Priority Data

Apr. 16, 1991 [JP] Japan ................................ 3-109576
Sep. 13, 1991 [JP] Japan ................................ 3-261353

[51] Int. Cl.⁶ ........................... G02F 1/141; G02F 1/1337
[52] U.S. Cl. ................................ 359/78; 359/56; 359/100
[58] Field of Search .......................... 359/54, 56, 87, 359/99, 100

[56] References Cited

U.S. PATENT DOCUMENTS

| | | | |
|---|---|---|---|
| 4,639,089 | 1/1987 | Okada et al. | 359/76 |
| 4,681,404 | 7/1987 | Okada et al. | 359/56 |
| 4,682,858 | 7/1987 | Kanbe et al. | 359/56 |
| 4,707,078 | 11/1987 | Geary | 359/100 |
| 4,712,873 | 12/1987 | Kanbe et al. | 359/56 |
| 4,712,874 | 12/1987 | Sekimura et al. | 359/75 |
| 4,712,875 | 12/1987 | Tsuboyama et al. | 359/75 |
| 4,712,877 | 12/1987 | Okada et al. | 359/54 |
| 4,714,323 | 12/1987 | Katagiri et al. | 359/56 |
| 4,715,688 | 12/1987 | Harada et al. | 359/100 |
| 4,720,173 | 1/1988 | Okada et al. | 359/100 |
| 4,728,176 | 3/1988 | Tsuboyama et al. | 359/87 |
| 4,738,515 | 4/1988 | Okada et al. | 359/79 |
| 4,740,060 | 4/1988 | Komura et al. | 359/75 |
| 4,747,671 | 5/1988 | Takahashi et al. | 359/56 |
| 4,763,995 | 8/1988 | Katagiri et al. | 350/341 |
| 4,765,720 | 8/1988 | Toyono et al. | 359/56 |
| 4,775,225 | 10/1988 | Tsuboyama et al. | 359/100 |
| 4,778,259 | 10/1988 | Kitayama et al. | 359/76 |
| 4,796,979 | 1/1989 | Tsuboyama | 359/77 |
| 4,796,980 | 1/1989 | Kaneko et al. | 359/75 |
| 4,824,218 | 4/1989 | Kuno et al. | 359/56 |
| 4,859,036 | 8/1989 | Yamanaka et al. | 359/58 |
| 4,883,344 | 11/1989 | Okada et al. | 359/75 |
| 4,900,132 | 2/1990 | Bos | 359/100 |
| 4,932,757 | 6/1990 | Hanyu et al. | 359/75 |
| 4,932,758 | 6/1990 | Hanyu et al. | 359/75 |
| 5,000,545 | 3/1991 | Yoshioka et al. | 359/75 |
| 5,007,716 | 4/1991 | Hanyu et al. | 359/87 |
| 5,013,137 | 5/1991 | Tsuboyama et al. | 359/56 |
| 5,189,536 | 2/1993 | Hanyu et al. | 359/100 |

FOREIGN PATENT DOCUMENTS

| | | |
|---|---|---|
| 444705 | 9/1991 | European Pat. Off. . |
| 2561005 | 9/1985 | France . |
| 280721 | 12/1987 | Japan . |
| 2157451 | 10/1985 | United Kingdom . |

OTHER PUBLICATIONS

Jakli et al., Ferroelectrics, vol. 69, No. ¾ (1986) 153:63.
Geary, SID Digest of Tech. Papers (1985)128:30.

*Primary Examiner*—William L. Sikes
*Assistant Examiner*—Kenneth Parker
*Attorney, Agent, or Firm*—Fitzpatrick, Cella, Harper & Scinto

[57] ABSTRACT

A liquid crystal cell is constituted by a pair of substrates respectively provided with scanning electrodes or data electrodes and uniaxial alignment axes which are substantially parallel with each other and substantially in the same direction, and a ferroelectric liquid crystal disposed between the substrates. At least one of the substrates is provided with ridges having a height at least one third of the spacing between the substrates or stripe transparent electrodes having thereon a stripe conductor film extending in the longitudinal direction of an associated one of the stripe transparent electrodes.

10 Claims, 11 Drawing Sheets

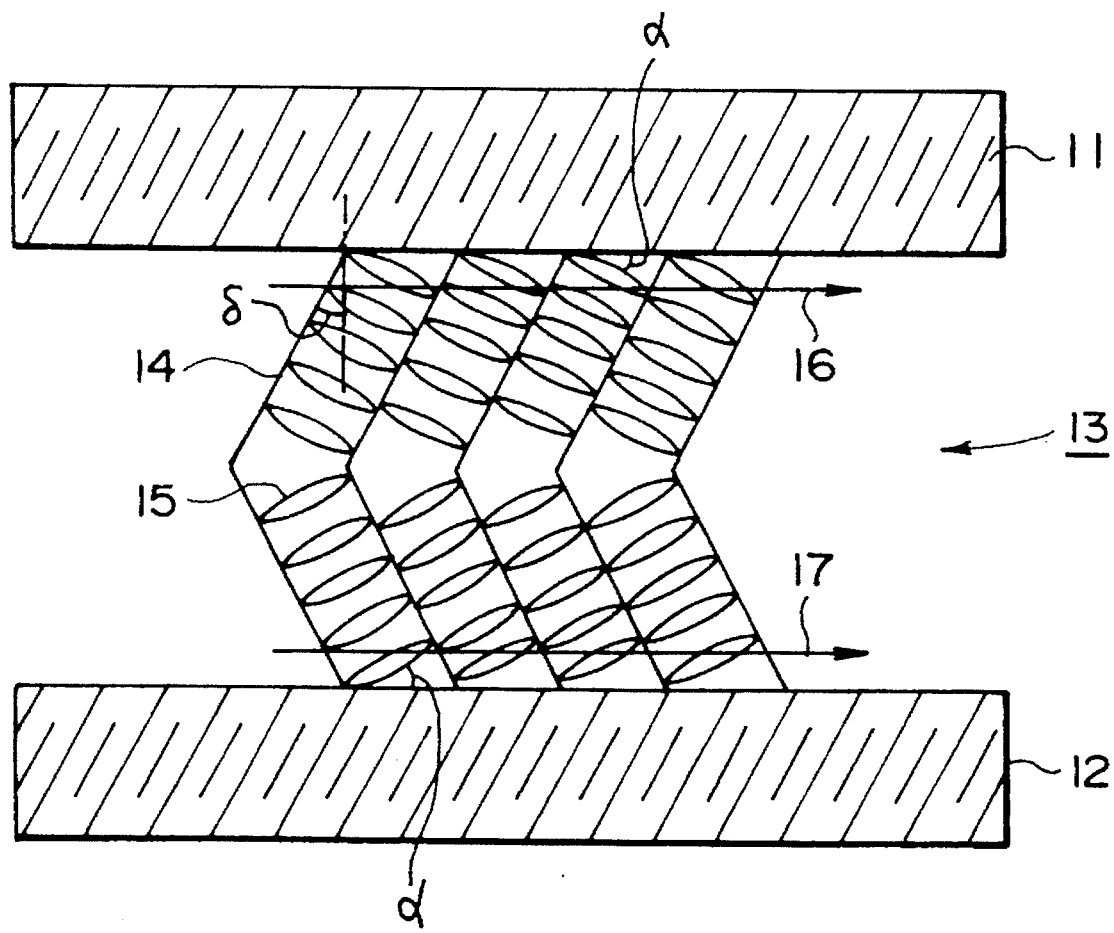
F I G. 1

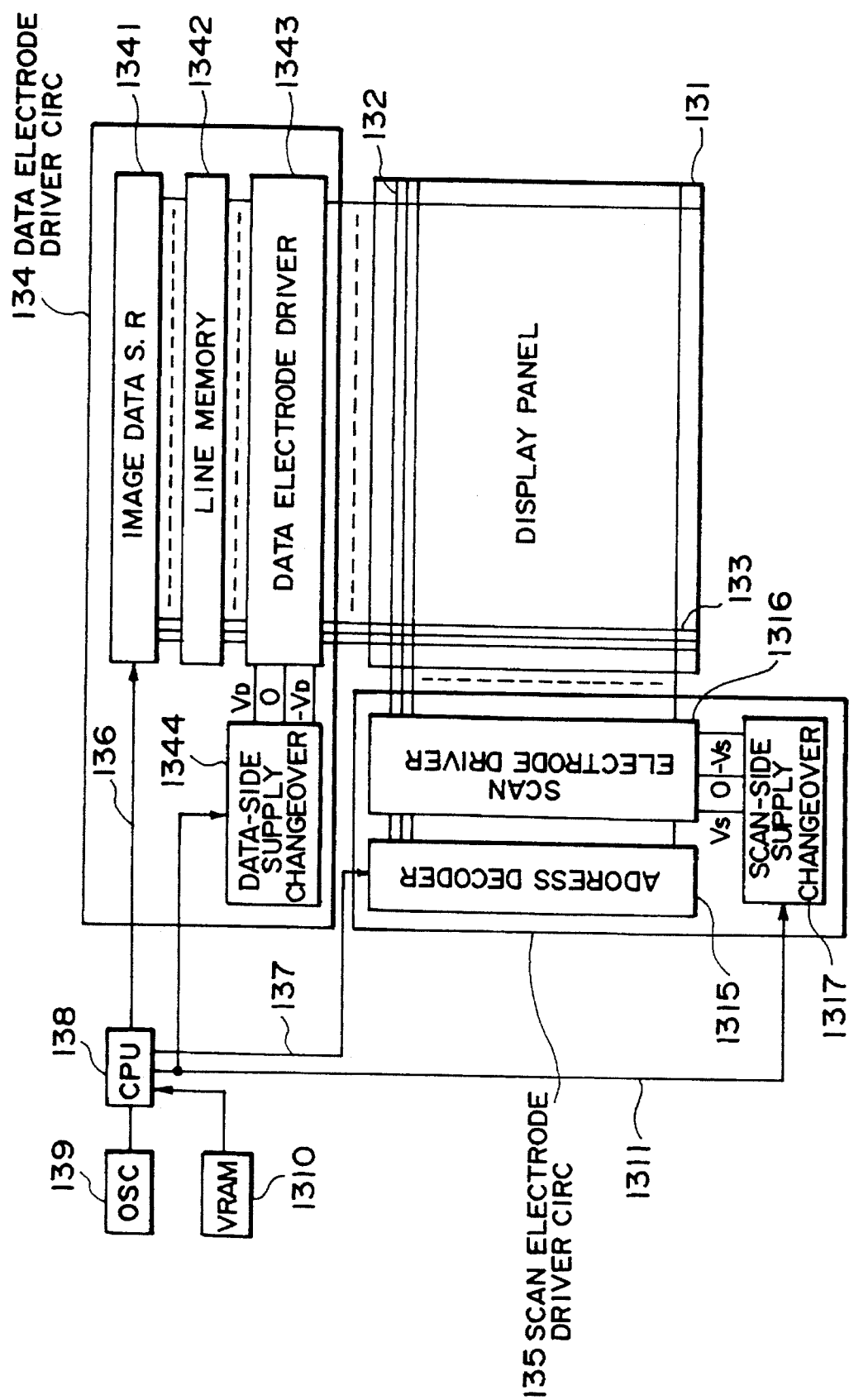
F I G. 13

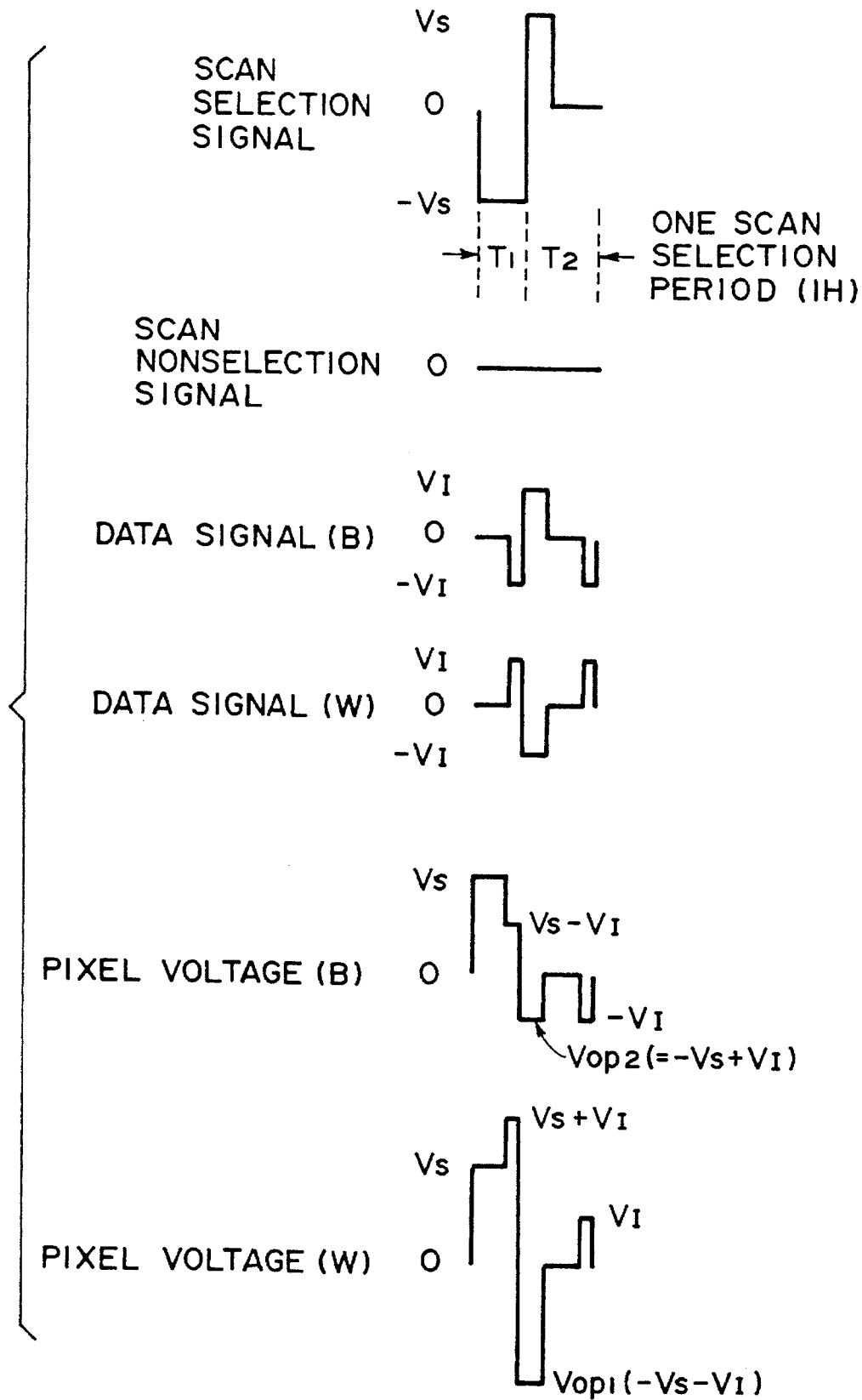
F I G. 14

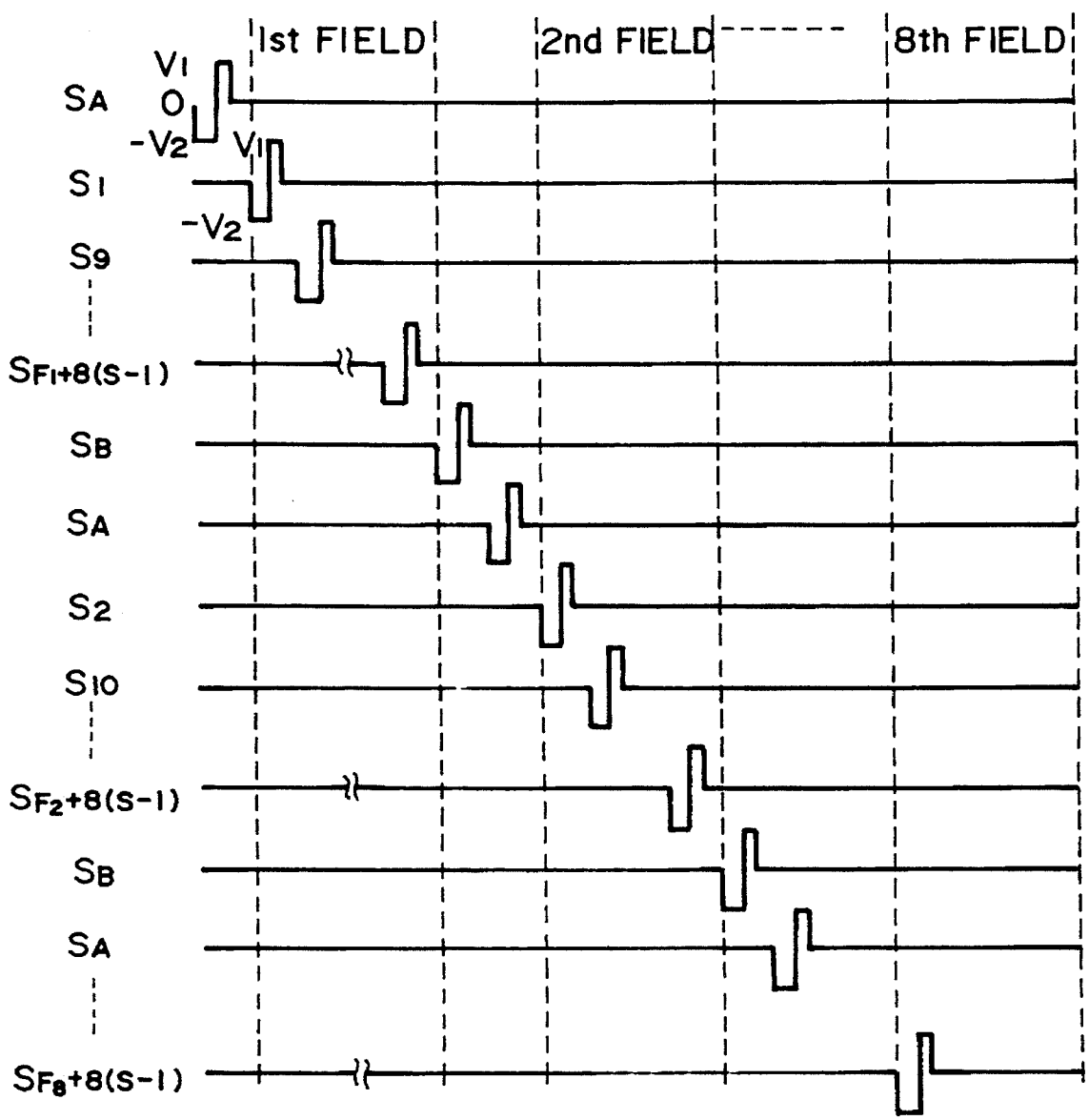
F I G. 15

LIQUID CRYSTAL APPARATUS

This application is a continuation of application Ser. No. 07/868,327, filed Apr. 14, 1992, now abandoned.

FIELD OF THE INVENTION AND RELATED ART

The present invention relates to a liquid crystal apparatus such as a display apparatus using a chiral smectic liquid crystal which shows ferroelectricity.

Display apparatus using a ferroelectric chiral smectic liquid crystal have been known as disclosed in, e.g., U.S. Pat Nos. 4,639,089, 4,681,404, 4,682,858, 4,712,873, 4,712,874, 4,712,875, 4,712,877, 4,714,323, 4,718,276, 4,738,515, 4,740,060, 4,765,720, 4,778,259, 4,796,979, 4,796,980, 4,859,036, 4,932,757, 4,932,758, 5,000,545 and 5,007,716.

Such a display apparatus includes a liquid crystal device comprising a cell structure formed by disposing a pair of glass plates each provided with transparent electrodes and an aligning treatment on their inner sides opposite to each other with a cell gap on the order of 1 to 3 μm and a ferroelectric chiral smectic liquid crystal (hereinafter sometimes abbreviated as "FLC") filling the cell gap.

Among such liquid crystal devices, a device containing FLC molecules in an alignment state providing a chevron structure as shown in FIG. 1 has been known to provide an excellent bright state and thus a sufficiently large contrast when combined with crossed nicol polarizers. More specifically, FIG. 1 is a sectional view showing an alignment state of FLC 13 disposed between substrates 11 and 12. The FLC 13 forms a plurality of layers 14 each comprising plural liquid crystal molecules 15. The layers 14 are aligned substantially in a direction and each layer 15 is bent between the substrates. The long axis of each liquid crystal molecule 15 may preferably be inclined to form a pretilt angle α of at least 5 degrees with respect to the substrates 11 and 12. The above-mentioned alignment state may preferably be formed by providing unidirectional alignment axes 16 and 17, which are parallel and in the same direction, to the substrates 11 and 12, e.g., by rubbing.

FIG. 2 (including FIGS. 2A–2C) is a plan view of a device in which FLC 13 assumes a chevron structure as described with reference to FIG. 1. The device in FIG. 2 is constituted by fixing the substrates 11 and 12 having unidirectional rubbing axes 16 and 17, respectively, to each other by means of a sealant 21 to leave a space which is filled with FLC 13. In the device, the substrate 11 is provided with a first group of plural stripe electrodes for voltage application (not shown), and the substrate 12 is provided with a second group of plural stripe electrodes (not shown) intersecting the first group of stripe electrodes, thus forming an electrode matrix. The normal 22 with a vector $n_s$ to the layers 14 of FLC 13 (more exactly the projection of the normal 22 onto the substrates) is substantially parallel to the rubbing directions 16 and 17 as shown in FIG. 2B. The liquid crystal molecules 15 in the device shown in FIG. 2 (FIGS. 2B and 2C) are uniformly oriented leftwards at a tilt angle +θ with their spontaneous polarization directing from the front face to the back face of the drawing.

According to our experiments, when the FLC in this state was supplied with a voltage (e.g., an AC voltage of ±8 volts and 10 Hz) applied between the opposite electrodes, a phenomenon was observed that the liquid crystal molecules 15 started to flow rightwards to result in regions 31 with less or lacking liquid crystal molecules 15 on the left side and a region 32 with more liquid crystal molecules 15, when the voltage application was continued for a long period (e.g., 20–50 hours), as shown in FIG. 3 where P denotes the optical axis of a polarizer and A denotes the optical axis of an analyzer arranged in cross nicols. As a result, an interference color was observed over the extension of the device to impair the display quality.

In case where the liquid crystal molecules 15 in FIG. 2B were uniformly oriented rightwards at a tilt angle −θ with their spontaneous polarization directing from the back face to the front face of the drawing, the liquid crystal molecules 15 were found to move leftwards in contrast to the above.

SUMMARY OF THE INVENTION

An object of the present invention is to provide a liquid crystal apparatus having solved the above-mentioned problem.

According to a principal aspect of the present invention, there is provided a liquid crystal apparatus, comprising:

(a) a liquid crystal panel comprising a pair of substrates and a chiral smectic liquid crystal disposed between the substrates, the chiral smectic liquid crystal being free from its helical structure and formed in a plurality of smectic layers each organized by plural liquid crystal molecules which are aligned in a first direction with a pretilt with respect to the substrates, the smectic layers being inclined with respect to the substrates and arranged in a second direction, and (b) drive means for applying a voltage signal causing one or another orientation state of the chiral smectic liquid crystal and an AC voltage not causing a transition from said one to another or said another to one orientation state of the liquid crystal, respectively to the liquid crystal, wherein at least one of said pair of substrates is provided with ridges which extend substantially in parallel with said second direction and have a height which is at least one third of a spacing between the substrates.

According to a second aspect of the present invention, there is provided a liquid crystal apparatus, comprising:

(a) a liquid crystal panel comprising a pair of substrates respectively provided with a group of parallel transparent stripe electrodes which are disposed to intersect each other with a spacing therebetween, and a chiral smectic liquid crystal disposed between the substrates, the chiral smectic liquid crystal being free from its helical structure and formed in a plurality of smectic layers each organized by plural liquid crystal molecules which are aligned in a first direction with a pretilt with respect to the substrates, the smectic layers being inclined with respect to the substrates and arranged in a second direction, and (b) drive means for applying a voltage signal causing one or another orientation state of the chiral smectic liquid crystal and an AC voltage not causing a transition from said one to another or said another to one orientation state of the liquid crystal, respectively to the liquid crystal, wherein the transparent parallel stripe electrodes on one of said pair of substrates are respectively provided with a stripe conductor film contacting the stripe electrode and extending substantially in parallel with said second direction.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a sectional view showing an alignment state of liquid crystal used in the present invention.

FIG. 13 is a block diagram of a liquid crystal apparatus of the present invention.

FIGS. 14 and 15 are waveform diagrams showing drive voltage waveforms supplied from a drive apparatus used in the present invention.

DESCRIPTION OF THE PREFERRED EMBODIMENTS

Hereinbelow, some embodiments of the present invention will be described with reference to the drawings.

Figure 4:
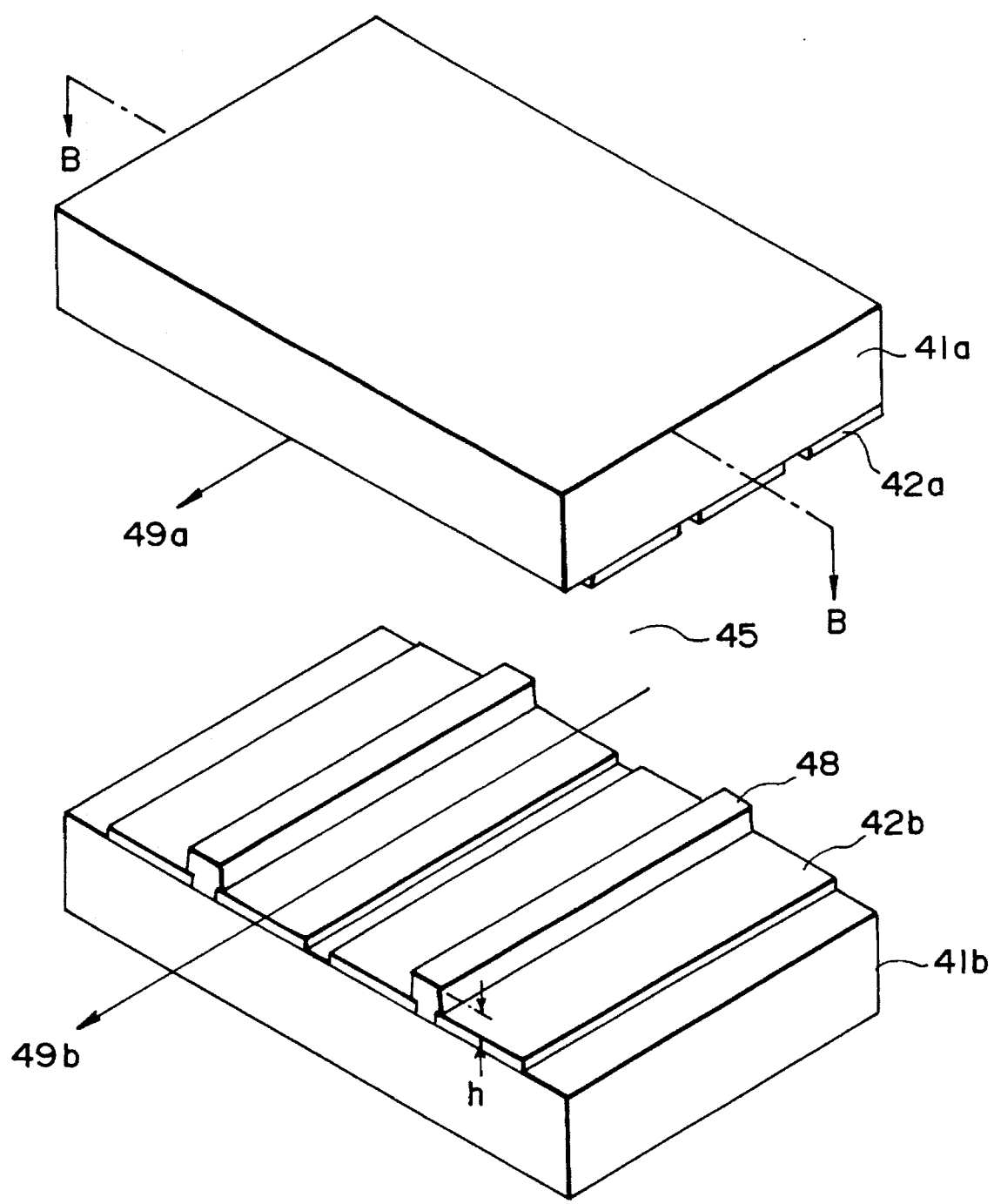
FIG. 4 is a perspective view showing a structure of a liquid crystal panel according to the present invention.
Figure 5:
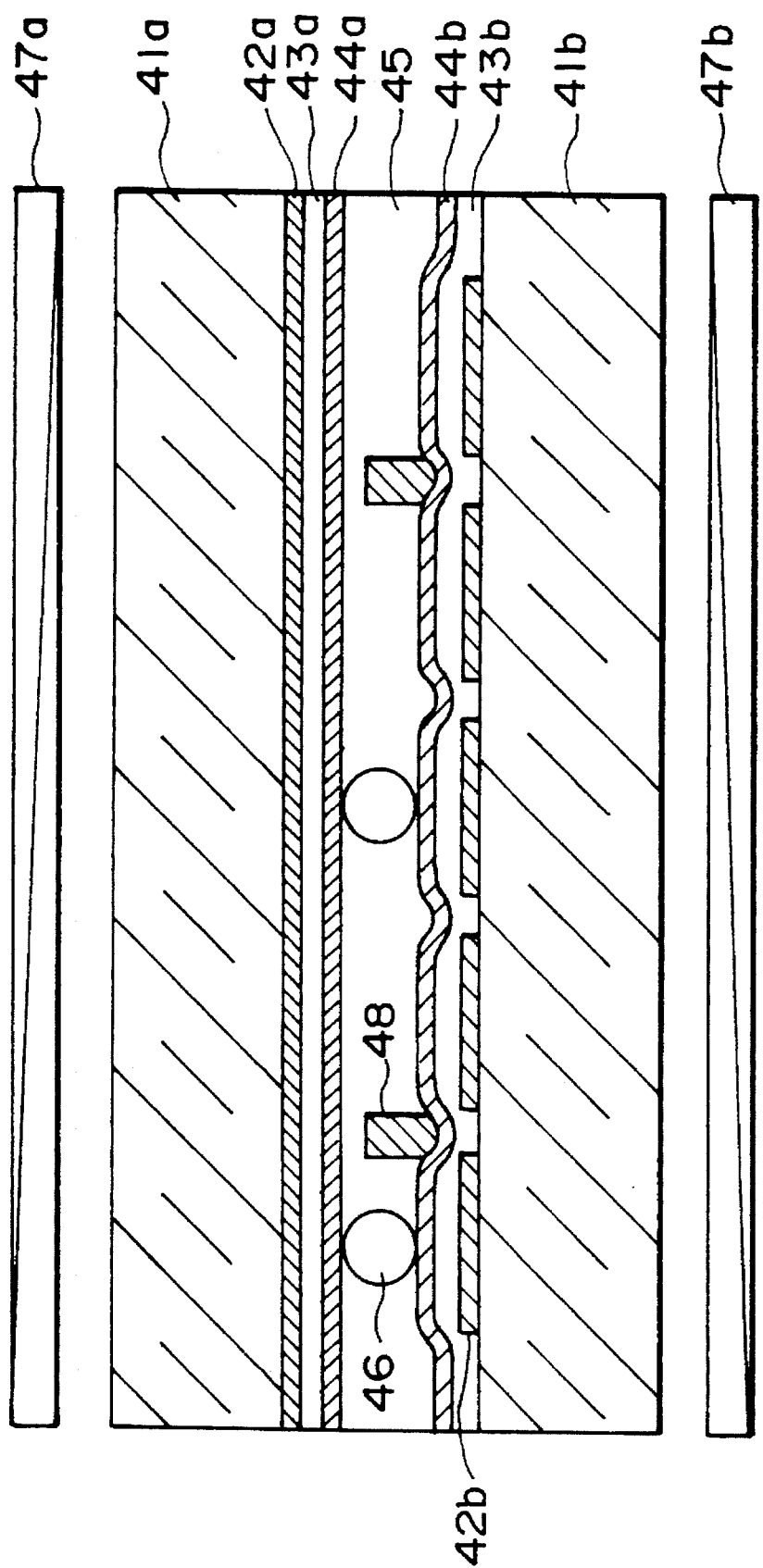
FIG. 5 is a sectional view of such a liquid crystal panel according to the present invention.

FIG. 4 is a perspective view schematically illustrating a liquid crystal cell for constituting an embodiment of the present invention, and FIG. 5 is a sectional view taken along a line B—B in FIG. 4. Referring to these Figures, the liquid crystal cell comprises a pair of an upper substrate 41a and a lower substrate 41b disposed in parallel with each other and transparent electrodes 42a and 42b of about 400–2000 Å in thickness disposed on the respective substrates. Between the upper substrate 41a and lower substrate 41b is disposed a ferroelectric liquid crystal 45, preferably a ferroelectric smectic liquid crystal in a non-helical structure providing at least two stable states. The transparent electrodes 42a and 42b are covered with alignment control films 44a and 44b, respectively, of e.g., a 40 to 1000 Å-thick film of a polymer, such as polyimide resin. The alignment control films 44a and 44b have respectively been rubbed to be provided with alignment axes (49a and 49b in FIG. 4, and a direction perpendicular to the drawing face in FIG. 5) which are in parallel with each other and in the same direction. It is possible to dispose an insulating film 43a (and/or 43b) of, e.g., $SiO_2$, $TiO_2$, or $Ta_2O_5$, in a thickness of, 200–3000 Å between the alignment control film 44a (and/or 44b) and the transparent electrode 42a (and/or 42b). The spacing between the substrates may be held by, e.g., silica beads 46 with an average diameter of, e.g., about 1.5 μm (generally 0.1–3.5 μm). The entire cell structure is disposed between a pair of cross nicol polarizers 47a and 47b.

Figure 6:
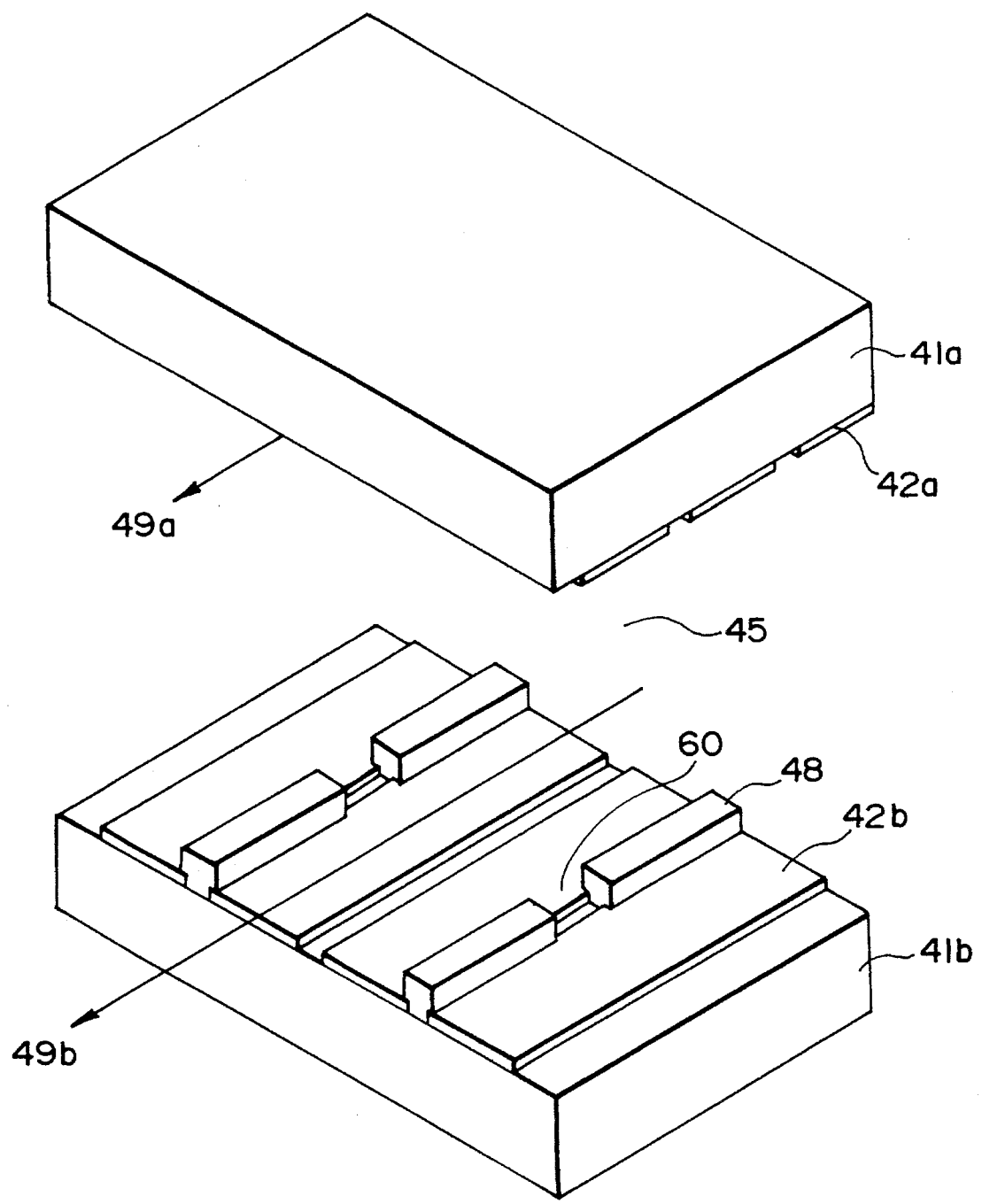
FIG. 6 is a perspective view showing a structure of another liquid crystal panel according to the present invention.

In this embodiment, a plurality of projecting ridges 48 are disposed e.g., at positions between the transparent electrodes 42 so as to extend in parallel with the uniaxial alignment axis 49b provided, e.g., by rubbing. The ridges may be composed of, e.g., an insulating material such as polyimide, a metal such as Mo or Al, or a laminate of a metal and an insulating material and formed by, e.g., photolithography. The height $\underline{h}$ of the ridges may be set to at least ⅓ of the cell spacing $\underline{d}$ (more accurately the distance between the alignment control films 44a and 44b) so as to effectively suppress the above-mentioned liquid crystal movement. More specifically, in case of $h/d \geq ⅓$, the increase in cell thickness may be suppressed to at most 10%. If the increase in thickness is suppressed to be at most 10%, noticeable color irregularity is not readily developed and thus the display quality is not impaired remarkably. The height $\underline{h}$ can be almost equal to the spacing $\underline{d}$. However, too large a height can result in a difficulty of a slower injection rate at the time of liquid crystal injection. For alleviating the difficulty, it is possible to dispose a spacing 60 between the ridges 48 as shown in FIG. 6.

The alignment axes 49a and 49b may be disposed in parallel with each other and in the same direction as described above or may be deviated from this so as to form an intersection angle of 2–15 degrees with each other.

Figure 8:
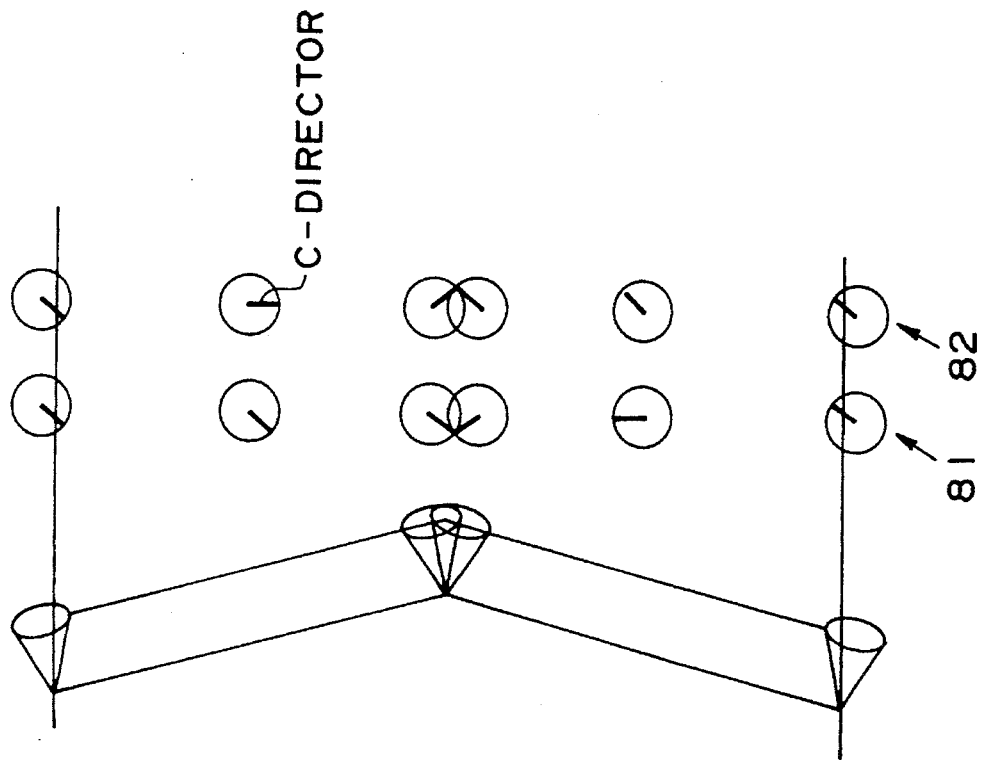
FIGS. 7 and 8 are explanatory views for illustrating changes in director orientation according to various positions between substrates in C1 alignment and C2 alignment, respectively.
Figure 7:
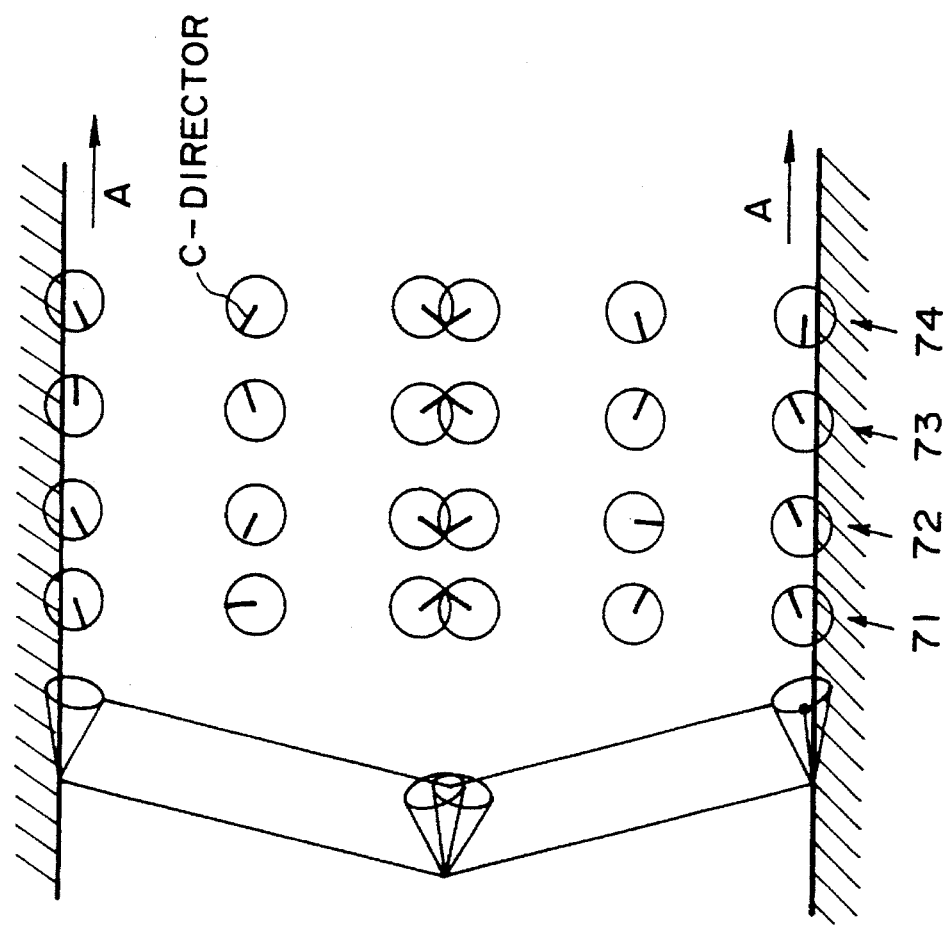

In the panel used in the present invention, as shown in FIG. 1, the smectic layers 14 may be inclined at an angle δ from a normal to the substrate 11 or 12, and the liquid crystal molecules 15 may be tilted at a pretilt angle α of at least 5 degrees so as to provide a maximum tilt angle Ⓗ (a half of an angle formed between director orientations given under application of writing voltages ±Vwr exceeding the threshold). In the present invention, a uniform alignment state as shown in FIG. 7 or 8 may be formed by satisfying a relationship of Ⓗ < α+δ.

In the uniform state, the directors are believed to be not twisted between the substrates in view of optical properties thereof. FIG. 7 is a schematic view illustrating director positions between the substrates in the respective states in C1 alignment. More specifically, at 71–74 are respectively shown changes in director positions between the substrates in the form of projections of directors onto cone bottoms as viewed from each bottom. At 71 and 72 is shown a splay state, and at 73 and 74 is shown a director arrangement which is believed to represent a uniform alignment state. As is understood from FIG. 7, at 73 and 74 representing a uniform state, the molecule position (director) is different from that in the splay state either at the upper substrate or lower substrate. FIG. 8 shows two states 81 and 82 in C2 alignment between which no switching is observed at the boundaries but an internal switching is observed. The uniform state in C1 alignment provides a larger tilt angle $θ_a$ (a tilt angle formed under application of AC voltages below the threshold as observed at pixels on non-selected scanning electrodes) and thus provides a higher contrast than the conventionally used bistable state in C2 alignment.

Figure 9:
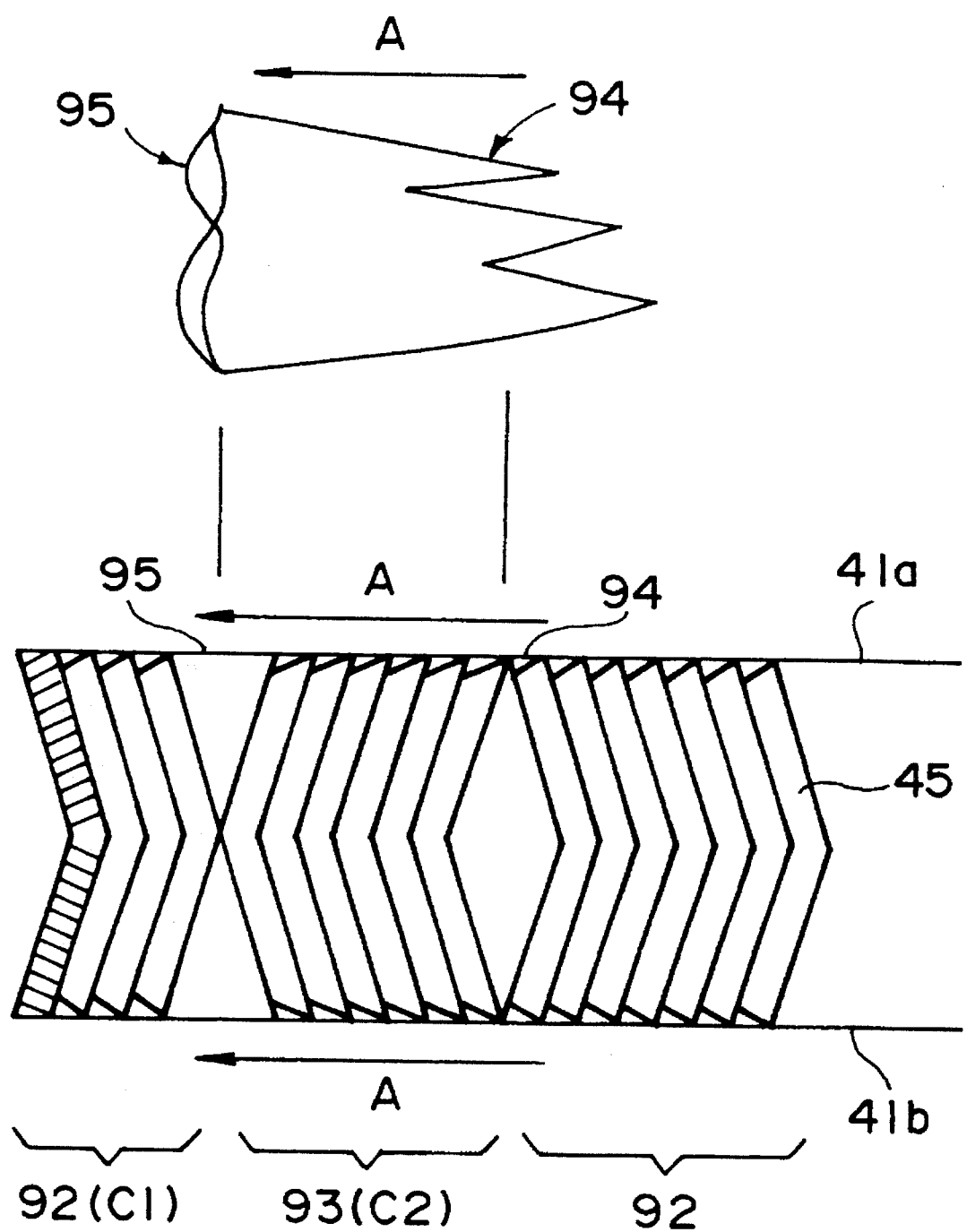
FIG. 9 is an explanatory view for illustrating an alignment state occurring in a chiral smectic liquid crystal used in the present invention.

The two types of alignment states C1 and C2 have been explained based on a difference in chevron structure of smectic layers as shown in FIG. 9. Referring to FIG. 9, reference numeral 91 denotes a smectic layer showing ferroelectricity, 92 denotes a C1 alignment region, and 93 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the substrates (chevron structure) as shown in FIG. 9. The bending of the layers can be caused in two ways corresponding to the C1 and C2 alignment as shown. As is well known, liquid crystal molecules at the substrate surfaces are aligned to form a certain angle (pretilt) α as a result of rubbing in such a manner that their heads (leading ends) in the rubbing directions are up or away from the substrate surfaces. Because of the pretilt, the C1 and C2 alignment states are not equivalent to each other with respect to their elastic energy, and a transition between these states can be caused at a certain temperature or when supplied with a mechanical stress. When the layer structure shown in FIG. 9 is viewed in plan as shown in the upper part of FIG. 9, a boundary 94 of transition from C1 alignment (92) to C2 alignment (93) in the rubbing direction A looks like a zigzag lightning and is called a lightning defect, and a boundary 95 of transition from C2 alignment (93) to C1 alignment (92) forms a broad and moderate curve and is called a hairpin defect.

In a preferred embodiment of the present invention, the angles $\text{Ⓗ}$ and $\theta_a$ may be set to satisfy a relationship of $\text{Ⓗ} > \theta_a > \text{Ⓗ}/2$.

Figures 2A, 2B, 2C:
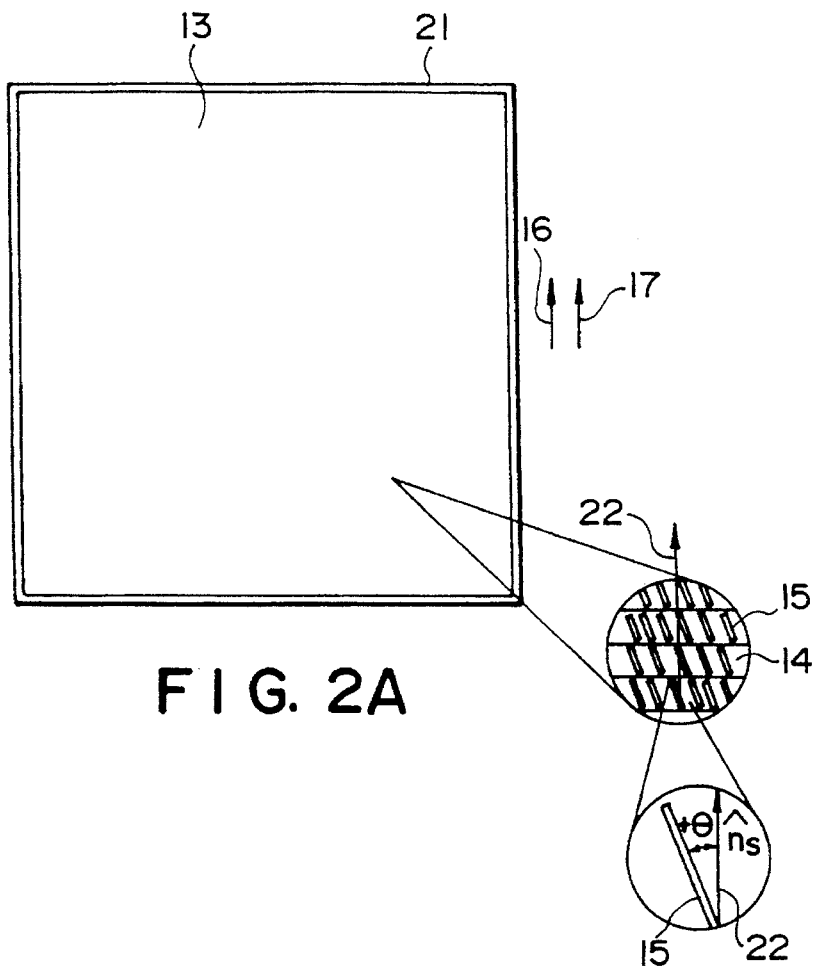
FIG. 2A shows a plan view corresponding to FIG. 1.
FIG. 2B is a partially enlarged view of FIG. 2A.
FIG. 2C is a partially enlarged view of FIG. 2B.
Figure 3:
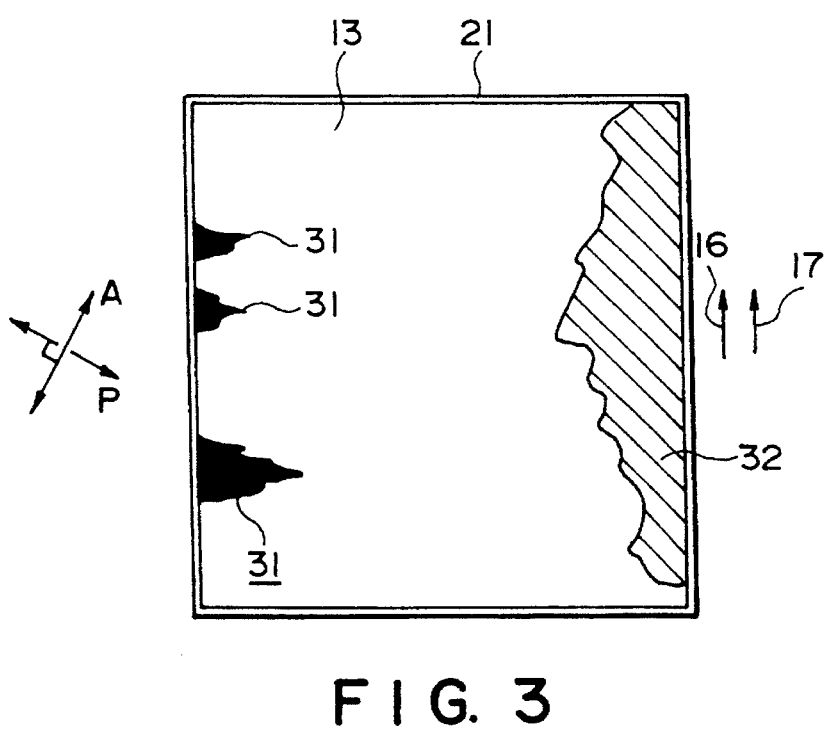
FIG. 3 is a plan view showing an alignment state in a conventional device.

In a particular cell example of the structure described above, the liquid crystal was uniformly oriented to assume an average molecular axis 22 providing an angle $+\theta_a$ as shown in FIG. 2C over the entire cell region and then supplied with rectangular AC pulses with a pulse width of 25 μs, a voltage amplitude of 40 volts and a duty factor of ½ for 7 hours. Thereafter, the cell thickness in the region 32 in FIG. 3 was measured and formed to have caused an increase of about 10% compared with the original value.

When a cell of the same structure except for removal of the ridges 48 was prepared and tested in the same manner, the increase in the cell thickness was formed to reach about 40% compared with the original value.

When another cell was prepared in the same manner as the above-mentioned cell example except that the ratio h/d was changed to ¼ and tested under the same voltage application conditions, the cell thickness increase was about 13% compared with the original value.

Figure 10:
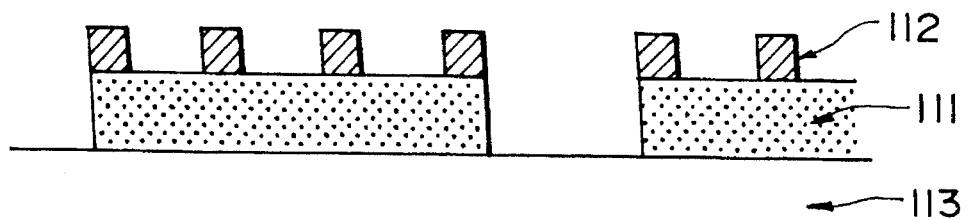
FIGS. 10 and 11 are respectively a sectional view of stripe transparent electrodes provided with stripe conductor films.

FIG. 10 is a partial sectional view of a liquid crystal cell structure used in another embodiment of the present invention. Referring to FIG. 10, the cell comprises a glass substrate 113 on which are disposed stripe transparent electrodes 111 constituting data electrodes or scanning electrodes and further thereon stripe conductor films 112 extending in the longitudinal direction of the stripe transparent electrodes 111. The transparent electrodes 111 are formed of 1500 Å-thick stripes of ITO having a width of 200 μm with a spacing of 10 μm from an adjacent one. The stripe conductor films 112 are formed of 500 Å-thick Mo films disposed in a width of 20 μm at a pitch of 50 μm.

In a particular example, a data electrode plate and a scanning electrode plate each having transparent electrodes 111 and stripe conductor films 112 as shown in FIG. 10 were provided and respectively coated with an insulating film and an alignment film and were superposed with each other to form a blank cell, which was filled with a liquid crystal to form a liquid crystal cell. When the cell was subjected to a voltage application test in the same manner as in the previous example, whereby the cell thickness increase was only about 10% or less after 500 hours whereas the increase reached about 50 % in a conventional cell using no stripe conductor films as described above.

Similar effects were observed when the Mo stripes were replaced with ITO stripes of the same dimension.

Figure 12:
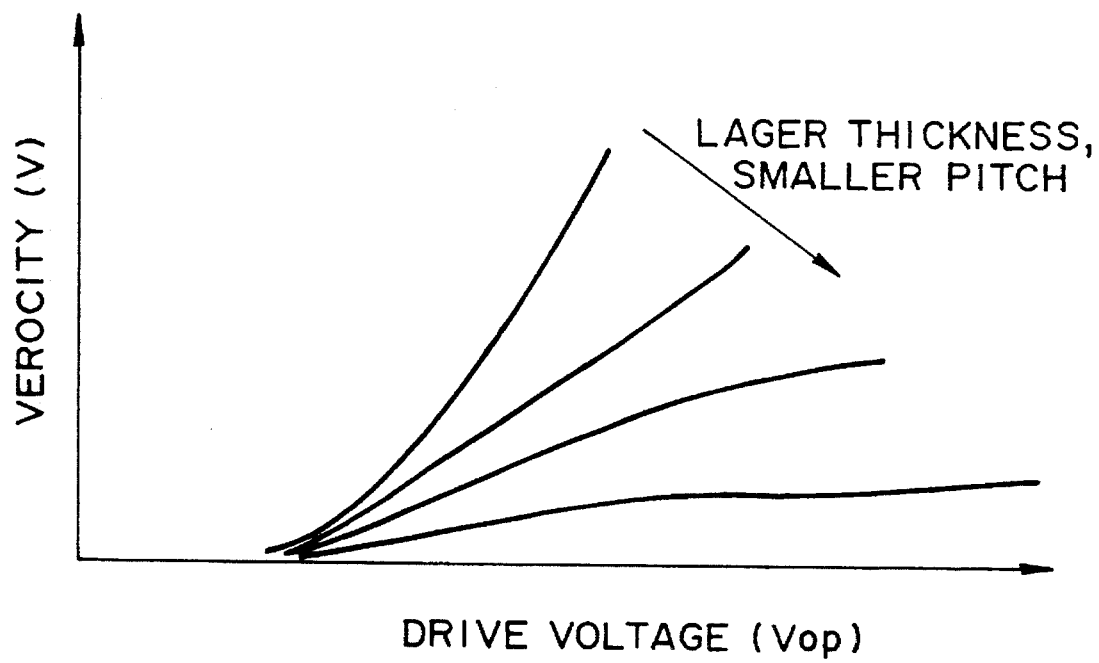
FIG. 12 is a graph showing a relationship between the velocity of liquid crystal molecular movement and the thickness and pitch of stripe conductor films on the stripe transparent electrodes.

As a result of testing by using different heights and pitches of the stripe conductor films and different voltages, a relationship as shown in Figure 12 was observed, thus showing the effectiveness of the stripe conductor films for suppressing liquid crystal molecular movement.

Figure 11:
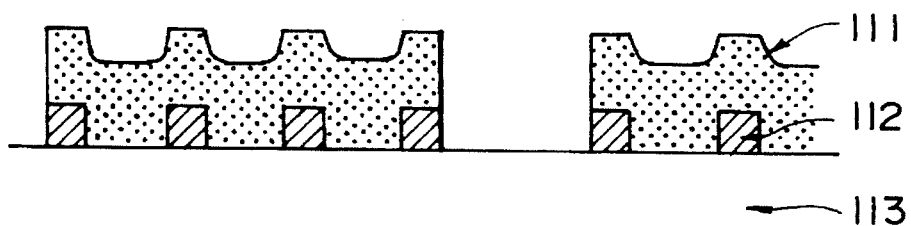

Another embodiment is shown in FIG. 11.

As a particular example, a liquid crystal cell was prepared by using a pair of electrode plates each having a structure shown in FIG. 11. First, 500 Å-thick stripe ITO films 112 were formed in a width of 20 μm and a pitch of 50 μm at parts of drive electrodes on each glass substrate 113 and then covered with 1500 Å-thick ITO transparent electrodes 111 in a width of 200 μm extending in the same direction as the ITO stripes 112. The thus prepared data electrode plates and scanning electrode plates were then respectively covered with an insulating film and an alignment film and were superposed with each other to form a blank cell, which was then filled with a ferroelectric liquid crystal to form a ferroelectric liquid crystal cell in the same manner as in the above example. When the cell was subjected to a voltage application test in the same manner as in the previous examples, whereby the cell thickness increase was only about 10% or less after 500 hours of continuous voltage application compared with about 50% increase after 24 hours in a conventional cell as described above.

Similar results were obtained when the ITO stripe films were replaced by stripe films of metals such as Mo and Cr. A similar relationship as shown in FIG. 12 was also observed between the liquid crystal molecule moving velocity and the height and pitch of the stripe conductor films.

In the present invention, the FLC may comprise a liquid crystal in a chiral smectic phase, more specifically, in chiral smectic C phase (SmC*), H phase (SmH*), I phase (SmI*), K phase (SmK*) or G phase (SmG*).

A particularly preferred class of FLC may include those showing cholesteric phase on a higher temperature side, which may for example include a pyrimidine-based mixture liquid crystal showing the following phase transition series and characteristic values.

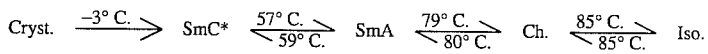

tilt angle $\text{Ⓗ}$=14 degrees
layer inclination angle δ=11 degrees
apparent tilt angle $\theta_a$=11 degrees.

In the above-mentioned examples, the above FLC was used in combination with rubbed polyimide alignment films to provide a pretilt angle α of 17 degrees, whereby the above-mentioned C1 uniform alignment state was realized.

FIG. 13 is a block diagram illustrating a structural arrangement of an embodiment of the display apparatus according to the present invention. A display panel 131 is composed of scanning electrodes 132, data electrodes 133 and an FLC having a chevron structure as shown in FIG. 1 disposed therebetween. The orientation of the ferroelectric liquid crystal is controlled by an electric field at each intersection of the scanning electrodes and data electrodes formed due to voltages applied across the electrodes.

The display apparatus includes a data electrode driver circuit 134, which in turn comprises an image data shift register 1341 for storing image data serially supplied from a data signal line 136, a line memory 1342 for storing image data supplied in parallel from the image data shift register 1341, a data electrode driver 1343 for supplying voltages to data electrodes 130 according to the image data stored in the line memory 1342, and a data side power supply changeover unit 1344 for changing over among voltages $V_D$, 0 and $-V_D$ supplied to the data electrodes 133 based on a signal from a changeover control line 1311.

The display apparatus further includes a scanning electrode driver circuit 135 which in turn comprises a decoder 1315 for designating a scanning electrode among all the scanning electrodes based on a signal received from a scanning address data line 137, a scanning electrode driver 1316 for applying voltages to the scanning electrodes 132 based on a signal from the decoder 1315, and a scanning side power supply changeover unit 1317 for changing over among voltages $V_S$, 0 and $-V_S$ supplied to the scanning electrodes 132 based on a signal from a changeover control line 1311.

The display apparatus further includes a CPU 138, which receives clock pulses from an oscillator 139 controls the image memory 1310, and controls the signal transfer over the data signal line 136, scanning address data line 137 and changeover control line 1311.

FIG. 14 shows a set of drive voltage signal waveforms used in the present invention. In one scanning selection period, a scanning selection signal having alternating voltages $\pm V_S$ and a voltage 0 is applied to a scanning electrode, wherein the voltages $\pm V_S$ and the voltage 0 are values defined with reference to the voltage level of a scanning non-selection signal. The data electrodes are supplied with a black or white data signal depending on given data. In this embodiment, the pixels on a scanning electrode supplied with a scanning selection signal are simultaneously erased into a black state in a period $T_1$ during one scanning selection period, and then in a subsequent period $T_2$, a pixel supplied with a data signal (B) is set to a black state and a pixel supplied with a data signal (W) is set to a white state.

In the apparatus of the present invention, temperature compensation may be effected by modulating (changing) the length of one scanning selection period (1H) and the magnitude of a drive voltage peak value $V_{OP}$ (capable of writing in black or white) which is $V_{OP1}$ or $V_{OP2}$ giving a maximum value during the period $T_2$.

FIG. 15 is a waveform diagram showing an example of a sequence of applying a scanning selection signal shown in FIG. 14 to the scanning electrodes. According to the scanning sequence shown in FIG. 15, a scanning selection signal is sequentially applied to the scanning electrodes $S_1, S_2 \ldots S_{F8+8(s-1)}$ every 8th electrode (7 electrodes apart) in one vertical scanning (field scanning) and one picture is formed through 8 times of field scanning to complete one frame scanning. In this instance, in each field scanning, the scanning selection signal is also applied to the scanning electrodes $S_A$ and $S_B$ in the non-display region. In FIG. 15, the symbols $F_1, F_2, \ldots, F_8$ each represent an ordinal number of field scanning in one frame scanning and the symbol s represents an ordinal number of scanning in one field scanning.

A series of experiments were conducted wherein the above-mentioned display operation was repeated by using a ferroelectric liquid crystal panel and the driving signal waveforms shown in FIGS. 14 and 15 while applying the scanning selection signal to the scanning electrodes 7 electrodes apart (in every 8-th electrode).

As described above, according to the present invention, it has become possible to provide a large-area liquid crystal cell, particularly a ferroelectric liquid crystal cell realizing a high-contrast alignment state, while alleviating liquid crystal molecular movement or a local cell thickness change liable to occur in continual display of a fixed pattern and leading to inferior display quality, by disposing ridges or stripe conductor films in contact with transparent electrodes, respectively extending in ia certain direction.

What is claimed is:

1. A liquid crystal apparatus, comprising:

(a) a liquid crystal panel comprising a pair of substrates respectively provided with a group of parallel transparent stripe electrodes which are disposed to intersect each other with a spacing therebetween, and a chiral smectic liquid crystal disposed between the substrates, the chiral smectic liquid crystal being free from its helical structure and formed in a plurality of smectic layers each organized by plural liquid crystal molecules which are aligned in one of two stable states with a pretilt angle of at least 5 degrees with respect to the substrates, the smectic layers being inclined with respect to the substrates so as to form a clockwise dull angle with one of the substrates and a counterclockwise dull angle with the other of the substrates, thereby being bent between the substrates, the smectic layers being further aligned to have normals providing a common protection extending in one direction onto one of the substrates, and (b) drive means for applying a voltage signal causing one or another orientation state of the chiral smectic liquid crystal and an AC voltage not causing a transition from said one to another or said another to one orientation state of the liquid crystal, said AC voltage causing movement of the liquid crystal molecules within the respective smectic layers, wherein the transparent parallel stripe electrodes on one of said pair of substrates are respectively provided with a stripe conductor film contacting the stripe electrode and extending in a direction substantially parallel to said common projection so as to suppress the movement of liquid crystal molecules within the respective smectic layers.

2. A liquid crystal apparatus according to claim 1, wherein each stripe transparent electrode is provided with a plurality of the stripe conductor film.

3. A liquid crystal apparatus according to claim 1, wherein the stripe conductor film is disposed between the stripe transparent electrode and the liquid crystal.

4. A liquid crystal apparatus according to claim 1, wherein the stripe conductor film is disposed between the stripe transparent electrode and the substrate.

5. A liquid crystal apparatus according to claim 1, wherein the pair of substrates have been provided with uniaxial alignment axes which are parallel with each other and in the same direction that is substantially identical to said second direction.

6. A liquid crystal apparatus according to claim 5, wherein said uniaxial alignment axes have been provided by rubbing.

7. A liquid crystal apparatus according to claim 1, wherein said smectic layers are inclined at an inclination angle δ from a normal to the substrates, the liquid crystal molecules are tilted at a pretilt angle $\alpha$, and the chiral smectic liquid crystal shows a maximum tilt angle $\textcircled{H}$ satisfying a relationship of $\textcircled{H}<\alpha+\delta$.

8. A liquid crystal apparatus according to claim 7, wherein said chiral smectic liquid crystal shows a tilt angle $\theta_a$ under application of said AC voltage, the $\theta_a$ satisfying a relationship of $\textcircled{H}>\theta_a>\textcircled{H}/2$.

9. A liquid crystal apparatus according to claim 1, wherein the pair of substrates have been provided with uniaxial alignment axes which are substantially in the same direction but deviated at an angle of 2–15 degrees from each other to provide a central axis therebetween which is substantially identical to said second direction.

10. A liquid crystal apparatus according to claim 9, wherein said uniaxial alignment axes have been provided by rubbing.

* * * * *